US012012175B2

(12) United States Patent
Peltomaa

(10) Patent No.: US 12,012,175 B2
(45) Date of Patent: Jun. 18, 2024

(54) SUSPENSION ARRANGEMENT OF SNOW VEHICLE

(71) Applicant: Autonomo Marko Peltomaa, Cómpeta (ES)

(72) Inventor: Marko Peltomaa, Cómpeta (ES)

(73) Assignee: Autonomo Marko Peltomaa, Competa (ES)

( * ) Notice: Subject to any disclaimer, the term of this patent is extended or adjusted under 35 U.S.C. 154(b) by 116 days.

(21) Appl. No.: 17/428,494

(22) PCT Filed: Feb. 10, 2020

(86) PCT No.: PCT/FI2020/050081
§ 371 (c)(1),
(2) Date: Aug. 4, 2021

(87) PCT Pub. No.: WO2020/169878
PCT Pub. Date: Aug. 27, 2020

(65) Prior Publication Data
US 2022/0126950 A1  Apr. 28, 2022

(30) Foreign Application Priority Data
Feb. 24, 2019 (FI) .................................. 20197036

(51) Int. Cl.
*B62M 27/02* (2006.01)
*B62D 55/07* (2006.01)
*B62D 55/108* (2006.01)

(52) U.S. Cl.
CPC ............ *B62M 27/02* (2013.01); *B62D 55/07* (2013.01); *B62D 55/108* (2013.01); *B62M 2027/026* (2013.01)

(58) Field of Classification Search
CPC .... B62D 55/30; B62D 55/112; B62D 55/108; B62D 55/07; B62M 27/02; B62M 2027/026
(Continued)

(56) References Cited

U.S. PATENT DOCUMENTS 1,256,744 A * 2/1918 Tolsma .................. B62D 55/02
305/152
3,877,534 A * 4/1975 Krause .................. B62M 27/02
180/9.1
(Continued)

FOREIGN PATENT DOCUMENTS

EP       2257462 B2    12/2010

OTHER PUBLICATIONS

International Search Report for PCT/FI2020/050081 dated May 18, 2020.
Written Opinion of ISA for PCT/FI2020/050081 dated May 18, 2020.

*Primary Examiner* — Anne Marie M Boehler
(74) *Attorney, Agent, or Firm* — Katterle Nupp LLC; Paul Katterle; Robert Nupp

(57) ABSTRACT

A snow vehicle, comprising a frame (102, 202), and to the frame (102, 202) operationally connected track system for moving the snow vehicle on the snow, which track system comprises a track (110, 210), and a slide rail (216) for slid-ing of the track, the snow vehicle further comprising a suspension structure (120) for attenuating impacts to the track system of the snow vehicle, which suspension system (120) comprises one or more suspension members (128). The suspension member (128) it at least partially arranged in the space between the track (110) and the frame (102).

17 Claims, 2 Drawing Sheets

(58) Field of Classification Search
USPC .......................................................... 180/193
See application file for complete search history.

(56) References Cited

U.S. PATENT DOCUMENTS

| | | | | |
|---|---|---|---|---|
| 4,222,453 A * | 9/1980 | Fixsen | ................... | B62M 27/02 |
| | | | | 180/9.54 |
| 4,286,682 A | 9/1981 | Stewart et al. | | |
| 4,442,913 A * | 4/1984 | Grinde | ................... | B62M 27/02 |
| | | | | 180/9.56 |
| 4,502,560 A * | 3/1985 | Hisatomi | ................ | B62M 27/02 |
| | | | | 305/128 |
| 4,917,207 A | 4/1990 | Yasui | | |
| 5,265,692 A * | 11/1993 | Mallette | ............... | B62D 55/116 |
| | | | | 180/9.56 |
| 5,947,217 A * | 9/1999 | Snare | ................... | B62D 55/108 |
| | | | | 305/128 |
| 6,112,840 A * | 9/2000 | Forbes | ................... | B62K 3/002 |
| | | | | 180/193 |
| 7,182,165 B1 * | 2/2007 | Keinath | ................. | B62M 27/02 |
| | | | | 280/22.1 |
| 8,479,860 B1 | 7/2013 | Jorgenson | | |
| 8,820,458 B2 * | 9/2014 | Giese | ................... | B62M 27/02 |
| | | | | 180/9.56 |
| 9,145,037 B2 * | 9/2015 | Hawksworth | .......... | B62M 27/02 |
| 2007/0221424 A1 | 9/2007 | Giese | | |
| 2011/0120793 A1 | 5/2011 | Lucarelli | | |
| 2020/0148291 A1 * | 5/2020 | Telford | ................. | B62D 21/15 |

\* cited by examiner

SUSPENSION ARRANGEMENT OF SNOW VEHICLE

CROSS-REFERENCE TO RELATED APPLICATION

This application is the U.S. national phase of PCT Application No. PCT/FI2020/050081 filed on 10 Feb. 2020, which claims priority to Finnish Patent Application No.: 20197036 filed on 24 Feb. 2019, the disclosures of which are incorporated in their entirety by reference herein.

TECHNICAL FIELD

The present disclosure relates to suspension arrangement of a track system of a snow vehicle, such as a snowmobile or a snow bike.

BACKGROUND

A snowmobile is a vehicle driven on snow by means of a track. Steering of the snowmobile takes place by turning a steering handle, which turns a ski or pair of skis at the front end of the snowmobile.

The snowmobile can be driven on uneven show with high speed, whereby the importance of the suspension system of the snowmobile is emphasized. The suspension of the snowmobile is typically implemented by providing separate suspension arrangements at the front and rear ends of the snowmobile.

The known solutions for implementing the suspension of the track of the snowmobile are associated with plurality of disadvantages. The suspension arrangements are very prone for breakage, they are heavy, and the suspension travels are relatively limited.

SUMMARY

A snow vehicle is disclosed that includes a frame and a track system for moving the snow vehicle on snow. The track system is operationally connected to the frame and includes a track and a slide rail for sliding of the track. A suspension structure is provided for attenuating impacts to the track system of the snow vehicle. The suspension structure includes support arms attached to and connecting the frame and the slide rail, and a cross-bar connecting the support arms and arranged between attachment points of the support bars to the frame and the slide rail. A suspension member is attached to the frame and to the cross-bar for attenuating movements of the suspension structure.

The features of the snow vehicle disclosed herein provide significant advantages in durability of the suspension of the snow vehicle. Furthermore, less parts are needed to implement the suspension, which reduces the weight of the snowmobile. Furthermore, the suspension travel can be increased, which achieves improved suspension when compared to known solutions.

BRIEF DESCRIPTION OF THE DRAWINGS

The features, aspects, and advantages of the present disclosure will become better understood with regard to the following description, appended claims, and accompanying drawings where:

DETAILED DESCRIPTION OF ILLUSTRATIVE EMBODIMENTS

The embodiments relate to suspension of the track of a snow vehicle. The snow vehicle refers here to a snowmobile, snow bike or corresponding vehicle drivable on snow by means of a track. In the following reference is made, for simplicity, to a snowmobile but the embodiments are as well applicable to other vehicles movable by means of a track.

The embodiments relate thus especially to suspension or shock absorption of the track of a snowmobile. The embodiments provide special advantages in provision front suspension of the track but are also applicable in providing rear suspension of the track. According to the embodiments, the suspension is arranged such that suspension members, such as shock absorbers and/or coil springs are arranged such that they reside at partly between the track and the frame of the snow mobile. Preferably the suspension means are completely between the track and frame in a so-called rear frame tunnel. In other embodiments, e.g. the upper end of the suspension member may be placed above the frame structure.

Figure 1:
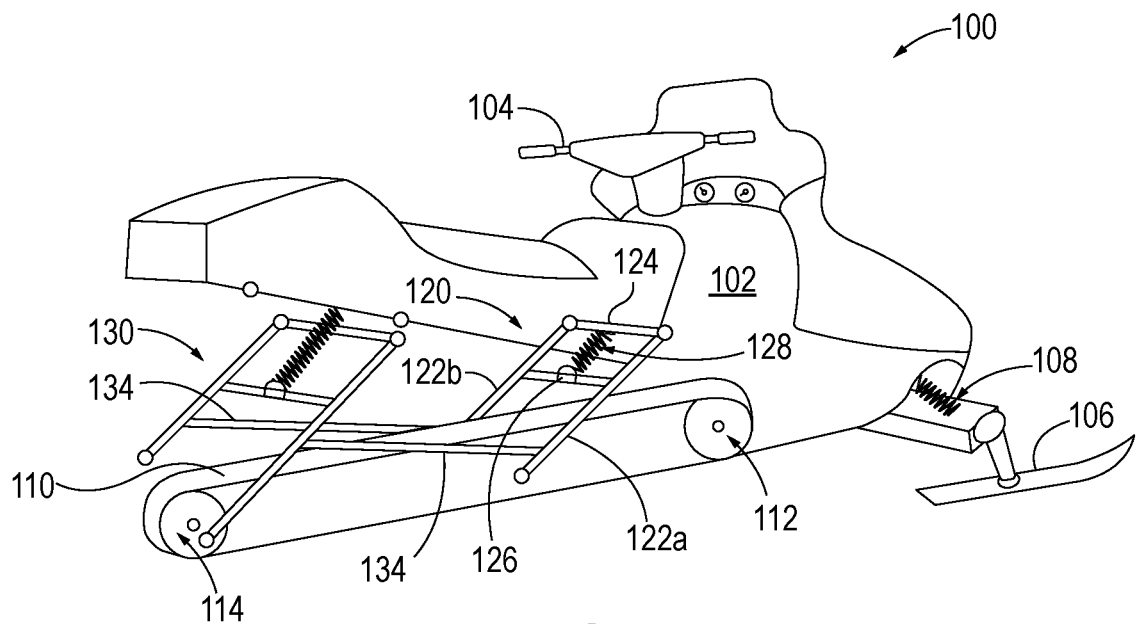
FIG. 1 shows a snowmobile and a suspension arrangement arranged in connection to the snowmobile.

FIG. 1 shows one embodiment of the snow vehicle of the present disclosure. The figure shows a snow mobile 100 having streering means, such as handlebars 104, in the front end of the frame 102, and a pair of skis 106 turnable by means of the handlebars. The front end comprises preferably a damping arrangement 108 for damping impacts that are subjected to the front end. The damping arrangement 108 may comprise one or more springs and/or shock absorbers.

The snowmobile comprises also a track 110, which track is arranged rotatable around two or more wheels 112, 114. The wheel 112 in the front end is preferably the driving wheel, so called drive wheel, whose power generation may be produced by means of a combustion engine or an electric motor. The snowmobile comprises also a slide rail, and the top side of the ground facing portion of the track is capable of sliding against the lower side of the slide rail.

According to the embodiments, the snowmobile comprises a suspension arrangement for damping impacts taking place at the track area. The suspension arrangement may comprise one or more suspension structures 120, 130. Preferably the suspension arrangement comprises two suspension structures, a first/front suspension structure 120 and a second/rear suspension structure 130. The front and rear suspension structures may be principally similar.

The suspension structure comprises a pair of support arms, or a first support arm 122A and a second support arm 122B, which are placed side to side on different sides of the snowmobile. The support arms may have fixed or constant length, whereby their length does not change during driving of the snowmobile. The rear suspension structure 130 comprises similarly two support arms on both sides of the snowmobile. Even though the principal structure of the front support structure 120 and the rear support structure are similar, the dimensions may be slightly different. The support arms in the front support structure may be slightly shorter than the support arms of the rear support structure. By way of an example, the length of the front support arm may be between 50 to 110 cm, preferably 55 to 95 cm, most preferably between 60 to 80 cm and the length of the rear support arm may be between 60 to 120 cm, preferably between 65 to 100 cm, even more preferably between 65 to 85 cm, the mentioned measures as all mentioned measures depending on the type and sized of the snowmobile. The support arms may be made of metal, for instance, or they be made of some durable composite material.

The support arms 122A, 122B have been fastened from their upper end fixedly to the frame 102 of the snowmobile and from their lower ends the support arms are fastened to the slide rail. Thus, in the embodiments, the slide rail is directly connected/coupled to the frame by means of the support arms of the support structure. The embodiments thus avoid complicated lever arm arrangements, where the suspension system comprises plurality of lever arms coupled to each other. Such systems are heavy and prone to breakage. The fastening of the support arm 122A to the frame of the snowmobile, and to the slide rail are rotatable fastenings, that is the support arm 122A can turn around its fastening points. The fastening to the slide rail can be made by means of a bolt, a bearing and a nut. The fastening to the frame 102 can be carried out means of a shaft 124 passing through, and extending to both sides of the frame, and by means of a bearing surrounding the shaft and nuts.

The attachment points of the support arms of the front support structure to the slide rail is 10 to 50 cm from the front end of the slide rail, preferably between 20 to 40 centimeters, and more preferably between 25 to 35 centimeters. The rear support structure may be attached substantially to the rear end of the slide rail.

The angles between the supports arm and the horizontal direction are, at rest of the snow vehicle, between 20 to 60 degrees, preferably between 30 to 50 degrees, and more preferably between 35 to 45 degrees.

The suspension structure comprises thus a pair of support arms, which support arms are arranged side-to-side on both sides of the track system. Preferably the fastening points of the support arms to the slide rail are longitudinally in mutually corresponding positions on both sides of the slide rail, and the fastening points of the support arms to the frame are accordingly in corresponding positions on both sides of the frame.

The fastening point of the support arms that are to be fastened to the frame are preferably as close as possible to the rotation axis of the drive wheel in order to ensure as good as possible tightness of the track. Preferably the fastening point of the support arm is as close as possible to a vertical line passing via the rotation axis of the drive wheel. Preferably the fastening point lies on the mentioned vertical line, but preferably less than 10 cm distance from the line, and even more preferably less than 5 cm distance from the line. In this way it is ensured that the track system may turn around a circular path.

The support arms are longitudinal bars but are not necessarily completely straight bars. In practice, the track 110 can be, for instance, slightly broader than the slide rail, whereby the support arm 122A needs to have a structure that can circumvent the portion of the track that sets above the slide rail. Starting from the attachment point to the slide rail, the support arm can first direct a certain distance directly upwards, then have a portion that directs outwards and/or upwards towards the side of the snowmobile, and then follows an inwards and towards the snowmobile directing portion before attachment to the frame of the snowmobile.

FIG. 1 shows also a cross-bar 126 which is arranged between the support arms 122A and 122B above the track. The cross-bar is attached to the support arms by means of welding, for instance, whereby the support arms and cross-bar form a uniformly turning rigid whole.

The attachment points of the non-rotatable rigid attachment of the cross-bars to the support arms may be slightly different in the front and rear suspension structures. However, in both support structures, the attachment point is between the ends of the support arms.

In the front suspension structure 120, the cross-bar may be attached to the support arms 122A and 122B to a distance between 30 to 70 centimeters from the attachment point of the support arm to the slide rail, preferably between 35 to 65 centimeters, and more preferably between 45 to 55 centimeters. In the front support structure, the attachment point of the cross-bar is between 60 to 80 percent of the length of the support bar when seen from the attachment point to the slide rail, more preferably between 65 to 75 percent of the length of the support arm. That is, the cross-bar resides closer to the attachment point to the frame than the attachment point to the slide rail.

In the rear support structure, the attachment point of the cross-bar to the support arms is preferably between 30 to 70 percent of the length of the support arm when seen from the attachment point to the slide rail, preferably between 40 to 60 percent and even more preferably between 45 to 55 percent of the length of the support arm.

According to the embodiments, the suspension member 128, which can comprise a shock absorber and/or a coil spring, is attached from its lower end to the mentioned cross-bar 126. The suspension member may be attached to the cross-bar in rotatable manner but, in any case, in such a manner that the suspension member is unable to move in the longitudinal direction of the cross-bar or the transverse direction of the frame of the snowmobile.

From its upper end, the suspension member is attached pivotably with respect to the frame of the snowmobile. In one embodiment, the attachment of the upper end of the suspension member to the frame of the snowmobile is implemented such that the suspension member is attached fixedly to a pipe, which pipe is capable of rotating with respect to a shaft placed inside the pipe, which pipe, on the other hand, is arranged rigidly to the frame of the snowmobile.

The rear suspension structure 130 is preferably principally similar to the front suspension structure 120. Thereby also the rear suspension structure comprises support arms, which are attached to the frame of the snowmobile and to the slide rail. Between the support arms there is arranged a cross-bar, and the suspension member is arranged between the cross-bar and the frame of the snowmobile.

In one embodiment, the first suspension structure 120 and the second suspension structure 130 are mechanically connected to each other, whereby the co-operation of the suspension structures can be ensured. The mechanical connection can be provided, for instance, in such a way that there is arranged a rigid or a detachably rigid side support arm 134 between the support arms residing on the same side of the snowmobile. The side support arm 134 is preferably arranged such that the front end, residing at the front end of the snowmobile, of the side support arm 134 is arranged slightly lower than the end of side support bar that is arranged at the rear end of the snowmobile. The length of the side support arm depends on the type and size of the snowmobile but preferably the length of the side support arm is between 50 to 120 cm, preferably between 50 to 100 cm, most preferably between 50 to 80 cm. The angle between the side support bar to the horizontal direction is between 0 to 25 degrees, preferably between 2 to 20 degrees, most preferably between 5 to 15 degrees such that the rear end is vertically higher than the front end.

The one preferred embodiment shown in FIG. 1 is characterized by that the suspension member 128 is arranged in the area or the space between the track 110 and the frame 102 of the snowmobile. The suspension members thus reside, in vertical direction, in the space above the track and below the frame. Preferably, the suspension members are arranged into a so-called frame tunnel of the snowmobile.

Even though FIG. 1 shows that the suspension means reside preferably between the track and the frame, it is alternatively possible to place the suspension member partly above the frame if there not enough space to place the suspension member completely under the frame. In such a case there may be a though hole or bushing in the frame such that the suspension member can fit through the frame. However, even in this embodiment, the suspension member is mainly located under the frame. Thereby, at least half of the longitudinal direction of the suspension member resides below the top surface of the frame.

Figure 2:
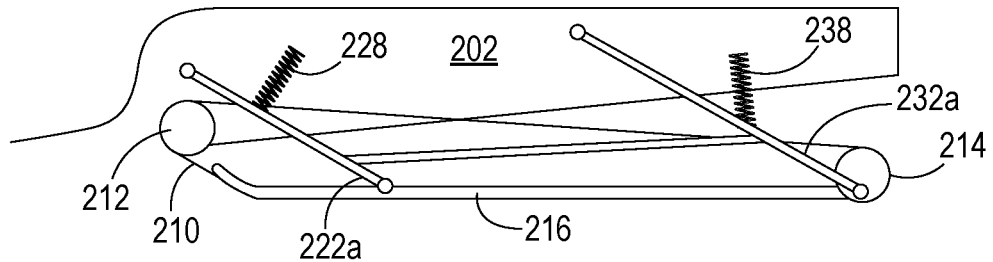
FIG. 2 shows a suspension arrangement illustrated from as a first side view.

FIG. 2 shows the suspension arrangement viewed from a side. FIG. 2 shows a drive wheel 212, a rear wheel 214 and a track 210 moving with respect to the wheels. FIG. 2 shows also a slide rail 216 under which the track 210 can slide.

The front suspension structure comprises a first support arm 222A which is attached from its upper end to the frame 202 of the snowmobile and from its lower end to the slide rail. Both attachments are rotatable attachments and preferably the lower end attachment to the slide rail is fixed such that the support arm 222A cannot move in the longitudinal direction of the slide rail 216. The first support arm 232 belonging to the second suspension structure may, however, be slidably attached to the slide rail 216. This means that the slide rail may have a longitudinal slot in which slot the end of the support arm 232A can move. In this way the tightness of the track is ensured when the track system moves in vertical direction during driving in situations when suspension is needed.

FIG. 2 shows a suspension member 228 belonging to the first suspension structure. As it can be seen, the suspension member is arranged to an angle with respect to the support arm when the snowmobile is at rest. In some embodiments, the angle between the suspension direction of the longitudinal suspension member and the upper end of the support arm is between 20 to 120 degrees, preferably between 50 to 110 degrees, more preferably between 80 to 95 degrees. Preferably the angle is over 90 degrees being between 90 to 150 degrees when compared to the upper end of the support arm. That is, compared to FIG. 2, the upper end of the suspension member can be even more to the right. In this way, when the snowmobile is driven in FIG. 2 to the left, and the track system hits a hump or pit, the suspension member resides substantially perpendicularly with respect to the surface of the hump thereby providing maximal attenuation.

At the rear end of the track system, the suspension member 238 is, in turn, tilted to the opposite direction compared to the front suspension member 228. The angle is preferably under 90 degrees being between 30 to 90 degrees, for instance. With respect to the upper end of the support arm of the second support structure, the suspension direction of the linear suspension member 238 is arranged to an angle between 20 to 100 degrees, preferably between 30 to 75 degrees, even more preferably between 35 to 55 degrees.

Figure 3:
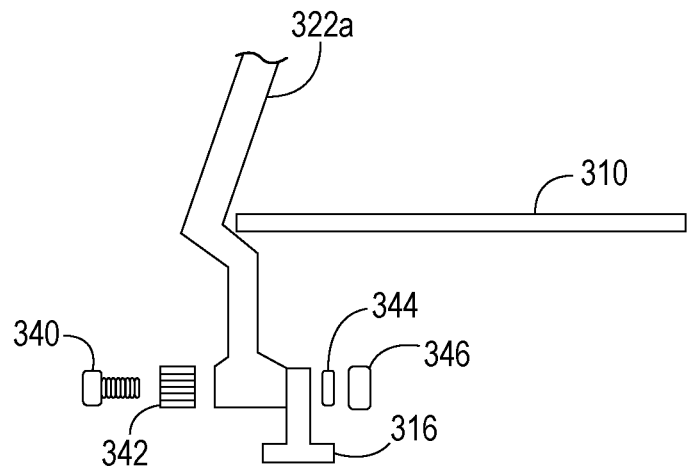
FIG. 3 shows the support arm circumventing the track.
Figure 4:
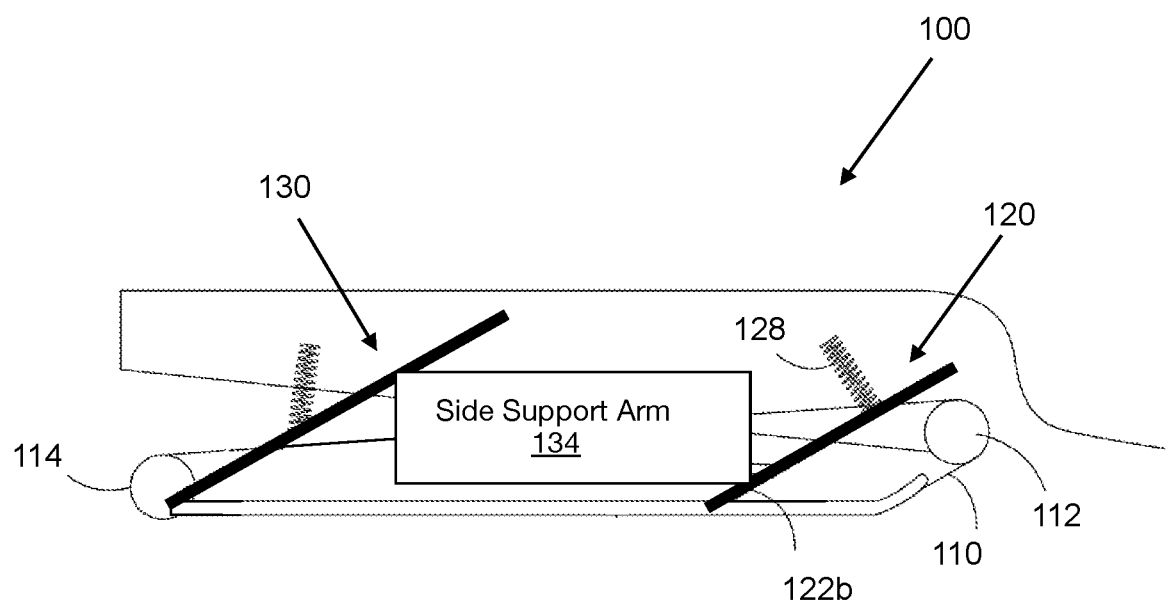
FIG. 4 shows a suspension arrangement illustrated from a second side view.

FIG. 3 illustrates the installation and the design of the support arm 322A. The figure shows the top side of the track 310 and it can be seen how the point where the support arm 322A is attached to the slide rail 316 sets inner when compared to the outer edge of he track 310, whereby there is formed a portion to the support arm 322A that circumvents the track 310. The circumventing portion may be made of piecewise linear portions or it may alternatively be curved.

The rotatable attachment of the support arm 322A to the opening in the slide rail 316 may be provided by the means of a bolt 340, bearing 342, washer 344 and a nut 346.

According to the embodiments, impacts targeted to the track system of the snow vehicle are attenuated by receiving the impacts with one or more suspension structures attached to the frame and slide rail of the snow vehicle, whereby the swinging of the suspension structures in the impact situation are attenuated by a suspension member operatively coupled to the suspension structure. Practically, when driving the snow vehicle, the rigid support arms of the support structure can turn about the attachment points of the upper ends whereby the track system/track can rise towards the frame of the snow vehicle.

The features of a snow vehicle of the present disclosure provide several advantages. One significant advantage is that the non-suspended mass of a snowmobile is significantly reduced, typically even about 20 kg when compared to suspension structures that are implemented within the area defined by the track system. It is clear that the solution according to the disclosure provides cost advantages compared to known solutions as the is need for less parts and thereby service objects. The lower mass provides also savings in fuel consumption.

The disclosed features can also provide significant advantages in durability of the suspension. One object in snowmobiles that is very prone to breakage is the so-called hanger bracket or the breakage of the suspension of the front end of the track system. The reason for this is that the front suspension member is typically oblique with respect to the impact direction. By means of features of this disclosure, the suspension member can be arranged to a position in which it receives the impacts in advantageous manner in natural operating position, that is, the impact is directed in the linear direction of a mainly linearly operating suspension member. The disclosed features also help avoid use of latches or lever arms in the implementation of the suspension.

The disclosed features provide the advantage the real suspension travel or the movement travel of the rear end of the snowmobile increases as much as 15 to 20 cm. This is caused by the fact that the track can be implemented as very low, whereby the distance between the upper surface and lower surface is significantly shorter than in structures where the suspension is arranged inside the track. As the track system is low, it can be allowed a longer travel in vertical direction, which naturally leads to better suspension.

By means of the disclosed features, the contact surface of the track to the ground increases because the lower structure allows extending the track further in longitudinal direction of the snowmobile.

The disclosed features allow easier adjustment of the height of the suspension and the attenuation force, because the suspension elements are easy to handle as they are above the track. In one embodiment, there are plurality of attachment points in the frame for the support arms, whereby the positions of the support arms and thereby the suspension are easy to adjust.

It is evident that when the technology further develops, aspects of the present disclosure can be implemented in various ways. The teachings of this disclosure are thus not limited to the embodiments shown above but can vary in the scope of the patent claims.

The invention claimed is:

1. A snow vehicle, comprising:
   a frame;
   a track system for moving the snow vehicle on snow, wherein the track system is operationally connected to the frame and comprises a track and a slide rail for sliding of the track; and
   a front suspension structure for attenuating impacts to the track system of the snow vehicle, the front suspension structure comprising front support arms attached to and connecting the frame and the slide rail, and a front cross-bar connecting the front support arms and arranged between attachment points of the front support arms to the frame and the slide rail;
   a rear suspension structure, wherein the front and rear suspension structures are arranged successively with respect to each other in a longitudinal direction of the snow vehicle;
   a side support arm for connecting the front suspension structure and the rear suspension structure mechanically to each other to provide their simultaneous movement; and
   a front suspension member attached to the frame and to the front cross-bar for attenuating movements of the front suspension structure; and
   wherein the front suspension member is arranged at least partially in a space between the track and the frame.

2. The snow vehicle according to claim 1, wherein the front support arms comprise a first front support arm arranged on a first side of the snow vehicle, and a second front support arm arranged on a second side of the snow vehicle, wherein the first front support arm and the second front support arm are attached rotatably at their first ends to the frame of the snow vehicle, and the first front support arm and the second front support arm are attached rotatably at their second ends to the slide rail.

3. The snow vehicle according to claim 2, wherein the first front support arm and the second front support arm have at least partly variable orientation between the attachment points to the frame and the slide frame in order to enable circumvention of the track.

4. The snow vehicle according to claim 2, wherein the snow vehicle further comprises a drive wheel for moving the track, and the attachment points of the first front support arm and the second front support arm are, in longitudinal direction of the snow vehicle, substantially aligned with the rotation axis of the drive wheel.

5. The snow vehicle according to claim 1, wherein the front cross-bar is fixed to each of the front support arms, at a distance between 30 to 70 centimeters from the attachment point of the front support arm to the slide rail.

6. The snow vehicle according to claim 1, wherein the attachment point of each of the front support arms to the slide rail is 10 to 50 cm from a front end of the slide rail.

7. The snow vehicle according to claim 1, wherein an angle between each of the front support arms and the horizontal direction, at rest of the snow vehicle, is between 20 to 60 degrees.

8. The snow vehicle according to claim 1, wherein the front cross-bar is fixedly attached to the front support arms so as to form a rigid support structure comprising the front support arms and the front cross-bar.

9. The snow vehicle according to claim 1, wherein a first end of the suspension member is pivotably connected to the frame of the snow vehicle.

10. The snow vehicle according to claim 1, wherein a suspension direction of the suspension member is arranged 30 to 150 degrees angle with respect to a longitudinal direction of the front support arms.

11. The snow vehicle according to claim 1, wherein the front suspension structure provides suspension to the front end of the track system, and wherein the front suspension member is arranged at a 20 to 120-degrees angle with respect to a longitudinal direction of upper ends of the front support arms of the front suspension structure.

12. The snow vehicle according to claim 1, wherein the rear suspension structure provides suspension to the rear end of the track system, wherein the rear suspension structure includes rear support arms and a rear suspension member arranged to attenuate the rear suspension structure, and wherein the rear suspension member is arranged at a 20 to 100-degrees angle with respect to a longitudinal direction of upper ends of the rear support arms of the rear suspension structure.

13. The snow vehicle according to claim 1, wherein the rear suspension structure further comprises:
   rear support arms attached to and connecting the frame and the slide rail;
   a rear cross-bar connecting the rear support arms and arranged between attachment points of the rear support arms to the frame and the slide rail;
   a rear suspension member attached to the frame and to the rear cross-bar for attenuating movements of the rear suspension structure;
   wherein the rear suspension member is arranged at least partially in a space between the track and the frame; and
   wherein the front suspension member and the rear suspension member each comprise a shock absorber or a coil spring.

14. The snow vehicle according to claim 13, wherein the side support arm is connected between a first one of the front support arms of the front suspension structure and a first one of the rear support arms of the rear suspension structure, wherein the first one of the front support arms and the first one of the rear support arms are located on the same first side of the snow vehicle.

15. The snow vehicle according to claim 14, wherein the side support arm is a first side support arm;
   wherein the snow vehicle further comprises a second side support arm connected between a second one of the front support arms of the front suspension structure and a second one of the rear support arms of the rear suspension structure, wherein the second one of the front support arms and the second one of the rear support arms are located on the same second side of the snow vehicle; and
   wherein each of the first and second side support arms has a front end disposed at the front of the snow vehicle and a rear end disposed at the rear of the snow vehicle; and
   wherein the front ends of the first and second side support arms are disposed lower than the rear ends of the first and second side support arms, respectively.

16. A snow vehicle, comprising:
   a frame;
   a track system for moving the snow vehicle on snow, wherein the track system is operationally connected to the frame and comprises a track and a slide rail for sliding of the track;
   a suspension structure for attenuating impacts to the track system of the snow vehicle, the suspension structure comprising support arms attached to and connecting the frame and the slide rail, and a cross-bar connecting the support arms and arranged between attachment points of the support arms to the frame and the slide rail;

a suspension member attached to the frame and to the cross-bar for attenuating movements of the suspension structure;

wherein the suspension member is arranged at least partially in a space between the track and the frame;

wherein the suspension member comprises a spring or a shock absorber;

wherein the track is loop-shaped and has upper and lower portions, and wherein the slide rail is disposed between the upper and lower portions of the track, whereby an inner surface of the lower portion of the track may slide under the slide rail;

wherein a portion of a first one of the support arms is configured to extend around an outer edge of the track, and wherein a lower end of the first one of the support arms is disposed between the upper and lower portions of the track and is connected to the slide rail.

17. The snow vehicle according to claim 16, wherein the suspension structure is a front suspension structure for providing suspension to the front end of the track system, wherein the support arms are front support arms, the cross-bar is a front cross-bar and the suspension member is a front suspension member arranged to attenuate the front suspension structure; and wherein the snow vehicle further comprises a rear suspension structure for providing suspension to the rear end of the track system, the rear suspension structure comprising:

rear support arms attached to and connecting the frame and the slide rail;

a rear cross-bar connecting the rear support arms and arranged between attachment points of the rear support arms to the frame and the slide rail;

a rear suspension member attached to the frame and to the rear cross-bar for attenuating movements of the rear suspension structure, the rear suspension member comprising a shock absorber or a coil spring; and wherein the rear suspension member is arranged at least partially in a space between the track and the frame.

* * * * *